United States Patent

[11] 3,577,186

[72] Inventor Michael E. Mitchell
Syracuse, N.Y.
[21] Appl. No. 828,485
[22] Filed May 28, 1969
[45] Patented May 4, 1971
[73] Assignee General Electric Company

[54] INVERSION-TOLERANT RANDOM ERROR CORRECTING DIGITAL DATA TRANSMISSION SYSTEM
4 Claims, 1 Drawing Fig.

[52] U.S. Cl. .... 340/146.1, 325/49
[51] Int. Cl. .... G08c 25/00, H04l 7/00
[50] Field of Search .... 340/146.1; 179/15; 325/49, 56, 58

[56] References Cited
UNITED STATES PATENTS 3,088,069 4/1963 Markey .... 325/49
3,164,804 1/1965 Burton et al. .... 340/146.1
3,303,333 2/1967 Massey .... 340/146.1X
3,398,400 8/1968 Rupp et al. .... 340/146.1

*Primary Examiner*—Malcolm A. Morrison
*Assistant Examiner*—Charles E. Atkinson
*Attorneys*—Norman C. Fulmer, Carl W. Baker, Frank L. Neuhauser, Oscar B. Waddell and Joseph B. Forman

ABSTRACT: A digital data transmission system is disclosed which decodes received error correction coded digital signals properly, irrespective of whether or not the polarities of these signals have become inverted during transmission or reception. The system thus permits a 180° phase ambiguity in the reinsertion of a regenerated suppressed carrier or subcarrier signal in the receiver, thereby simplifying the receiver in addition to correcting errors to improve the reliability of data transmission. The disclosed decoder circuitry includes a plurality of modulo 2 adder circuits for generating a plurality of estimators each of which is the mod 2 sum of an even number of the received digits. These estimators are fed to a threshold decision circuit which provides a serial readout of the decoded digits. The threshold decision circuit may consist of a simple majority decision circuit or a multiple input threshold circuit with either equal or unequal weighting factors on its input estimators.

INVENTOR:
MICHAEL E. MITCHELL,

BY Norman C. Fulmer
HIS ATTORNEY.

INVERSION-TOLERANT RANDOM ERROR CORRECTING DIGITAL DATA TRANSMISSION SYSTEM

BACKGROUND OF THE INVENTION

The invention is in the field of electronic systems for the transmission of information in the form of coded digital signals. The invention is particularly advantageous in suppressed-carrier communication systems for the transmission of coded digital signals representing information such as computer data, telemetry information (for rockets and space stations, for example), stock market quotations, airline reservations, and other business and scientific data.

A frequently used technique for transmitting information, is to convert the information into a binary form consisting of 1 bits and 0 bits. These bits are frequently grouped into binary data words representing the elemental units of data to be transmitted. The type of coded information transmission system to which the invention best applies, employs an encoder at the transmitter which appends a number of extra (redundant) bits to each binary data word to form a code word for transmission, and employs a decoder at the receiver which decodes the received coded signals to recover the data words. Numerous error-correcting codes have been devised, having the general characteristic of adding redundant bits to the data words according to systematic rules so as to form code words such that, if during transmission a limited number of the bits in a code word becomes altered or obliterated due to static, noise, fading or other causes, the received code word will nonetheless differ from any other code word in a sufficient number of bits so that the decoder will be able to properly decode it into the correct binary data word.

One type of error-correcting system, described in U.S. Pat. No. 3,237,160 to Michael E. Mitchell and assigned to the same assignee as the present invention, employs a decoder at the receiver which functions to compare each incoming word with a code word vocabulary. By the process of correlation, the correct (or most likely correct) binary data word is selected and fed out of the decoder.

Another general type of error-correcting system, to which the present invention belongs, is described in U.S. Pat. Nos. 3,164,804 and 3,222,644 to Burton and Mitchell and assigned to the same assignee as the present invention. In this type of system, each received binary word is sequentially fed into a register, and "estimator" logic circuits generate output signals (estimators) in accordance with the contents of certain stages of the register. A majority logic circuit provides an output bit in accordance with the majority of the estimators. The register is then shifted one step and the foregoing sequence repeated, and so on, whereby the decoded data-word bits are obtained and fed out from the decoder.

For efficient transmission of the coded binary words via radio waves, over telephone lines, or other media (such as magnetic tape), suppressed carrier techniques are advantageously employed so that more of the available energy can be used for transmission of the modulation information and less energy is wasted on transmission of a carrier. However, in receivers that require a reconstituted carrier to be generated in correct phase with the suppressed carrier for achieving proper demodulation, it is necessary to transmit a residual carrier, subcarrier, or pilot signal for maintaining the correct phase of the regenerated carrier. If this proper phasing is not maintained, the demodulated digits can become inverted (complemented), and unless a means is provided for detecting this event, the output of the demodulator will be ambiguous. Such transmission of a residual carrier, or subcarrier, or pilot signal, undesirably increases the complexity of the system and also reduces the amount of available energy that can be utilized for transmitting the useful modulation information. Attempts to increase the relative amount of energy in the modulation increases the error probability and delay in detecting the proper carrier phase, particularly at the lower signal-to-noise ratios. The foregoing difficulties of suppressed carrier techniques also arise if suppressed subcarriers are utilized with, or in lieu of, suppressed carrier transmission. The alternative of using differentially coded transmission (such as by representing a 1 with a phase shift and a 0 with the absence of a phase shift) has been extensively used as a means of resolving the 1–0 ambiguity without transmitting residual carrier or other reference signals. However, it is a well-known fact that this last alternative can convert isolated bit errors into double adjacent bit errors. It is also well known that differentially coherent recovery of the received digits causes an objectionable degradation in receiver performance. Those familiar with the state of the art in this field are keenly aware of the need for a practical technique capable of fully realizing the advantages of suppressed carrier transmission.

SUMMARY OF THE INVENTION

Objects of the invention are to provide an improved error-correcting coding system, and to provide such a system which is inversion tolerant whereby proper decoding is achieved without resorting to differential coding or differentially coherent demodulation and without the necessity of providing any residual carrier, subcarrier, pilot signal, or other special phasing means for reinsertion of a regenerated carrier.

The invention comprises, briefly and in a preferred embodiment, a signal coding and transmission system for digital error correction code words of the appropriate type, comprising a decoder provided with a plurality of modulo 2 adder circuits each of which adds different combinations of an even number of bits selected from the received code word, whereby each of said adder circuits produces a separate estimate of the same code bit, and a threshold decision device (such as a majority logic circuit) which uses the estimates to decide on the likely value of the transmitted code bit. A decoder timing circuit provides shift pulses so as to iterate the estimation, decision and readout of successive decoded bits. The invention also comprises, in combination with the foregoing, a suppressed carrier or other equivalent means for transmitting and receiving code words with an allowed 1–0 ambiguity in the decoder input, such as is provided by double-sideband suppressed-carrier transmission from a phase-reversal-keyed transmitter together with quasi-coherent synchronous detection using a regenerated carrier having an allowed 180° phase ambiguity.

DESCRIPTION OF THE PREFERRED EMBODIMENT

Figures 1, 2:
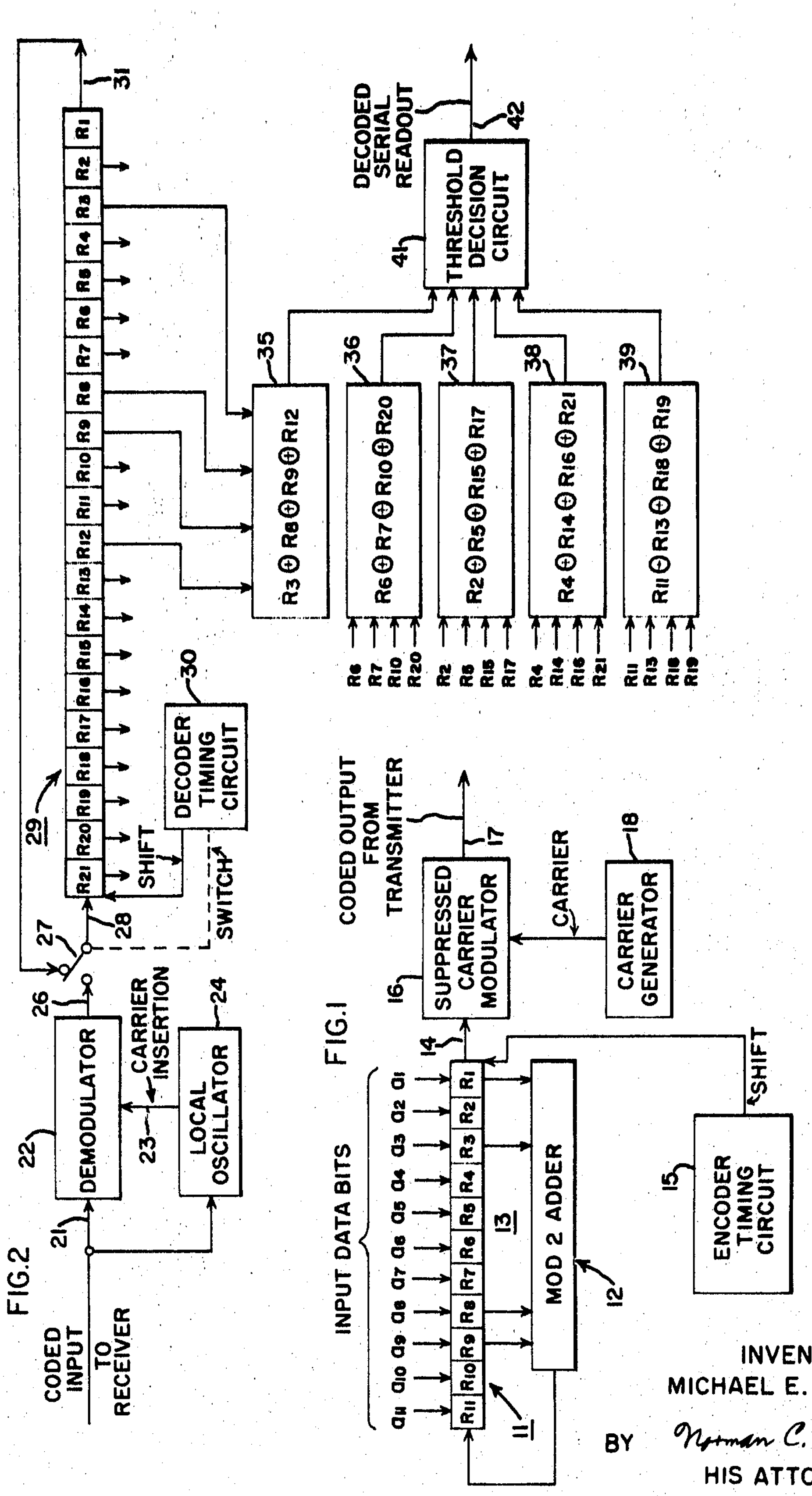
FIG. 1 is an electrical block diagram of a transmitter in accordance with a preferred embodiment of the invention.
FIG. 2 is an electrical block diagram of a receiver in accordance with the preferred embodiment of the invention.

In the transmitter circuit of FIG. 1, a plurality of binary data bits $a_1$ through $a_{11}$ are respectively applied to stages $R_1$ through $R_{11}$ of a shift register 11. The contents of stages of $R_1$, $R_3$, $R_8$, and $R_9$ are fed to a modulo 2 adder 12, the output of which is fed into stage $R_{11}$ of the shift register 11. The input data bits $a_1$ through $a_{11}$ each constitutes a binary 1 or 0, in standard binary parlance. The mod 2 adder 12 provides the mod 2 sum of the binary inputs. As is well known, mod 2 addition is the same as binary addition except that carries are ignored. The symbol for mod 2 addition is ⊕ and the possible summations of the various combinations of binary inputs are as follows:

$$0 \oplus 0 = 0$$
$$1 \oplus 1 = 0$$
$$0 \oplus 1 = 1$$
$$1 \oplus 0 = 1$$

The arrangement of the shift register 11 and mod 2 adder 12 comprises an encoder 13 that can produce, at the output 14 of the shift register 11, any word of the (21, 11) code, consisting of 21 bits per coded word, of which the first 11 bits are data bits and the remaining 10 are redundant bits added for coding purposes. The shift register 11 is sequentially shifted toward the right under control of a timing circuit 15, a step at a time, to produce the aforesaid coded output at 14. The aforesaid Pat. No. 3,222,644 shows and describes in more detail an arrangement for producing any word of the (15, 7) code. The code words comprising various other codes can be similarly produced.

The binary code words at the output 14 of the encoder 13 are fed to a suppressed-carrier modulator 16 which modulates a carrier or subcarrier, provided by a carrier generator 18, with the data bits and simultaneously or subsequently suppresses the carrier or subcarrier. Multiple information channels may be achieved by employing a combination of carriers and associated subcarriers. For convenience, the term "carrier" as used herein will be understood to include the substitution or addition of one or more subcarriers. Supressed-carrier modulation is provided at the output 17 of the suppressed-carrier modulator 16. In accordance with a feature of the invention, no residual carrier, pilot signal, nor other carrier reinsertion phasing signal need be provided at the transmitter output 17. The transmitter output at 17 is transmitted by suitable means, such as radio waves or telephone wires, to a receiver.

In the receiver of FIG. 2, the signal received from the transmitter of FIG. 1 is fed, after detection and amplification if required, to the input 21 of a demodulator 22 to which a regenerated carrier signal is inserted at 23, from a synchronized local oscillator circuit 24. The local oscillator is synchronized to the frequency of the suppressed carrier of received signal 21, but the local oscillator phase is allowed to be either 0° or 180° relative to the suppressed-carrier phase. The output of the demodulator, at 26, consists of the demodulated bits to be fed to the decoder. In this example, the output 14 of the encoder 13 is a word of the (21, 11) code. Since no carrier insertion phasing means is required nor provided in the system of the invention, the 1 and 0 bits at the output 26 of the demodulator 22 will be the same, except for transmission errors, as the 1 and 0 bits provided at the output 14 of the encoder 13 only at times when the carrier insertion 23 happens to be in phase, or approximately in phase, with the suppressed carrier of received signal 21. At other times this relationship will be inverted (complemented); i.e., except for transmission errors, 1's will appear at demodulator output 26 corresponding to 0's at the encoder output 14, and, conversely, 0's will appear at output 26 of demodulator 22 corresponding to 1's at output 14 of encoder 13, at times when the carrier insertion at 23 is 180° out of phase or approximately 180° out of phase with the suppressed carrier of the received signal 21. In prior art systems this inversion of the demodulated bits with no indication of its occurrence is intolerable; however, in accordance with feature of the invention, the aforesaid inversion of demodulated bits is of no consequence, because the decoder will provide proper decoded data bits irrespective of complementing or inversion of the received code word bits.

An electronic switch 27 is arranged to temporarily connect the output 26 of demodulator 22 to the input 28 of a 21 stage shift register 29, whereupon the 21 stages of shift register 29 become loaded with the 21 bits of a received code word. The switch 27 then connects the shift register input 28 to the output 31 thereof, to provide a feedback loop for sequentially shifting the received word bits from the output to the input of the shift register 29. Five modulo 2 adder circuits 35, 36, 37, 38, and 39 are provided. Four different stages of the shift register 29 are connected to each of the modulo 2 adders 35—39, as shown in FIG. 2. The outputs of the five modulo 2 adders 35—39, are connected to inputs of a threshold decision circuit 41, which may comprise majority logic circuit, the output 42 of which is a sequential readout of the decoded binary data word bits which, in the example shown, is 11 bits per data word. If one or two of the input bits to the decision circuit 41 are erroneous, due to interference or for other reasons the majority logic will, on the basis of the remaining three correct input bits, provide the correct output bit. After each majority logic decision, the shift register 29 is shifted one stage, and the procedure is repeated. After a received code word has been decoded and the decoded data word has been read out, the switch 27 functions to load another received code word into the shift register 29, and so on. The aforesaid switching and shifting is controlled by a decoder timing circuit 30. In the arrangement shown, the contents of stage $R_1$ of shift register 29 is not fed to an adder circuit because the connections as shown from stages $R_2$ through $R_{21}$ of the shift register 29 to the adder circuits 35—39 are sufficient to insure that received code words with up to two bit errors are properly decoded and read out at the majority logic output 42, even if such words have been complemented.

In accordance with a feature of the invention, the contents of an even number of stages of the shift register 29 are fed to each of the modulo 2 adder circuits 35 through 39. By so doing, the modulo 2 sum output of each of the adder circuits will be unaffected by inversion or complementing of the bits fed into the adders. This is illustrated by the following example of modulo 2 addition, in which although the four bits of the right-hand column are inversions of the four bits of the left hand column, nevertheless the resulting modulo 2 addition remains the same:

| | |
|---|---|
| 1 | 0 |
| 1 | 0 |
| 1 | 0 |
| 0 | 1 |
| 1 | 1 |

The following example shows how an odd number of bits can result in different sums if the bits are inverted:

| | |
|---|---|
| 1 | 0 |
| 1 | 0 |
| 0 | 1 |
| 0 | 1 |

Since the arrangement of the invention results in an inversion tolerant system, correct functioning of the circuit will be unaffected by whether or not the carrier inserted at 23 is in phase or 180° out of phase with the suppressed carrier at 21, and therefore the system of the invention functions properly without the necessity for transmitting any phase-correcting signal. If the carrier insertion at 23 is in phase with the suppressed carrier, the bits fed into shift register 29 will be the same polarity (except for bit errors) as the bits in the transmitted code word; if the carrier insertion at 23 is in reversed phase with the suppressed carrier, these bits will be inverted, but this is of no consequence for successful functioning of the circuit, as has been explained above. So long as the inserted carrier at 23 has the same frequency of the suppressed carrier, the circuit will function properly regardless of whether it is in phase or 180° out of phase with the suppressed carrier. However, there may occasionally be an inversion occurring near the middle of a received code as it enters shift register 29, whereupon there will be decoding error since the polarity of the bits in the first and second parts of the received word will be opposite. However, the frequency of this occurrence can be made at least as low as the frequency of occurrence of a 180° phase error in the reinserted carrier due to obliteration of the phasing signal by static or other interference in prior art systems.

While a preferred embodiment of the invention has been shown and described, various other embodiments and modifications thereof will become apparent to persons skilled in the art, and will fall within the scope of the invention as defined in the following claims.

I claim:

1. A coded error-correcting digital data transmission system of the type having a transmitter and a receiver, said transmitter including an encoder for encoding the data bits to be transmitted into an error correcting code word containing redundant bits and suppressed-carrier modulator means for providing a transmitted signal having modulation in accordance with said code word, and said receiver including means for demodulating said transmitted signal and decoder means for decoding the demodulated signal, said decoder means comprising a multiple stage shift register for accommodating the demodulated code bits of a word wherein the improvement comprises a plurality of modulo 2 adders each having input connections to an even number of stages of said shift register, and a threshold decision circuit connected to receive the outputs of said modulo 2 adders, said modulo 2 adders which are connected to an even number of shift register stages constituting the only modulo 2 adders connected between said shift register and said threshold decision circuit, said receiver including a carrier insertion means connected to said signal demodulating means, and in which no additional synchronizing signal is provided between said transmitter and said receiver for controlling the phase of the receiver inserted carrier with respect to said suppressed carrier.

2. A system as claimed in claim 1, for use with the (21, 11) code, in which said shift register comprises 21 stages, and comprising five of said modulo 2 adders each having four inputs, means connecting the inputs of a first of said adders respectively to stages 3, 8, 9, and 12 of said shift register, means connecting the inputs of a second of said adders respectively to stages 6, 7, 10, and 20 of said shift register, means connecting the inputs of a third of said adders respectively to stages 2, 5, 15, and 17 of said shift register, means connecting the inputs of a fourth of said adders respectively to stages 4, 14, 16, and 21 of said shift register, and means connecting the inputs of the fifth one of said adders respectively to stages 11, 13, 18, and 19 of said shift register.

3. A decoder for decoding code words transmitted without a subcarrier signal and demodulated in a receiver by insertion of a regenerated carrier signal, comprising a multiple stage shift register and means for feeding a received code work into said shift register, wherein the improvement comprising a plurality of modulo 2 adders each having input connections to an even number of stages of said shift register, and a threshold decision circuit provided with inputs and an output, said inputs connected to receive the outputs of said modulo 2 adders, said modulo 2 adders being connected to an even number of shift register stages and constituting the only modulo 2 adders connected between said shift register and said threshold decision circuit to produce the decoded output signal at said output of said threshold decision circuit independent of the phase of the regenerated carrier signal in said receiver.

4. A system as claimed in claim 3, for use with the (21, 11) code, in which said shift register comprises 21 stages, and comprising five of said modulo 2 adders each having four inputs, means connecting the inputs of a first of said adders respectively to stages 3, 8, 9, and 12 of said shift register, means connecting the inputs of a second of said adders respectively to stages 6, 7, 10, and 20 of said shift register, means connecting the inputs of a third of said adders respectively to stages 2, 5, 15, and 17 of said shift register, means connecting the inputs of a fourth of said adders respectively to stages 4, 14, 16, and 21 of said shift register, and means connecting the inputs of the fifth one of said adders respectively to stages 11, 13, 18, and 19 of said shift register.